Feb. 21, 1956
M. SHEPHERD, JR
2,735,984
SIGNAL CONVERTOR
Filed Oct. 28, 1954
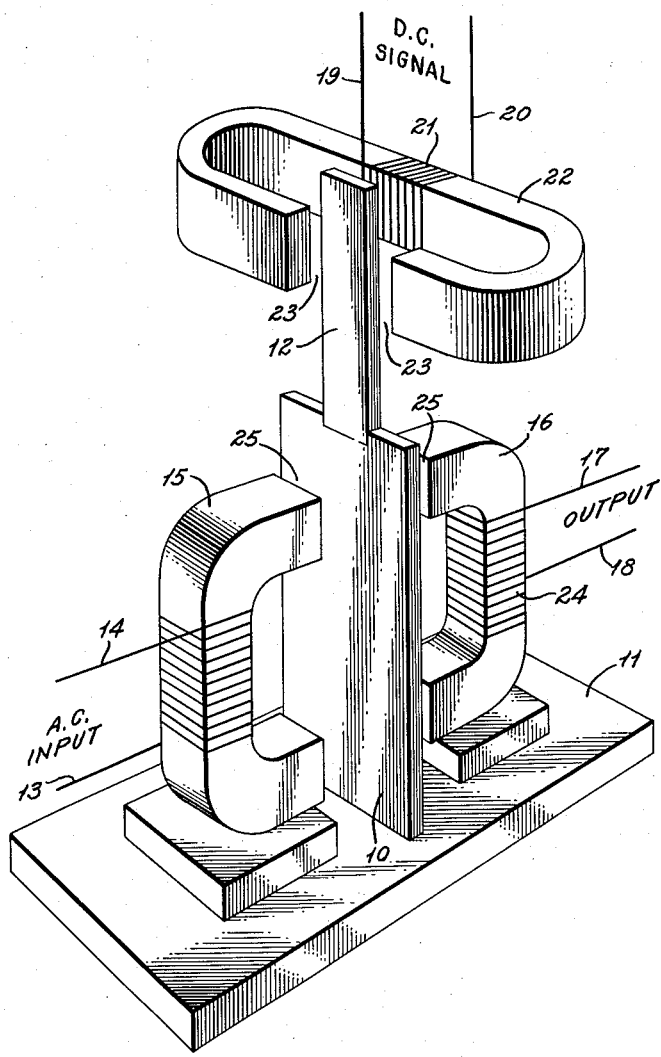
INVENTOR
Mark Shepherd, Jr.
BY Stevens, Davis, Miller & Mosher
ATTORNEYS United States Patent Office 2,735,984
Patented Feb. 21, 1956

2,735,984

SIGNAL CONVERTOR

Mark Shepherd, Jr., Dallas, Tex., assignor to Texas Instruments Incorporated, Dallas, Tex., a corporation of Delaware Application October 28, 1954, Serial No. 465,283

3 Claims. (Cl. 332—51)

This invention relates to the amplification and recording of minute electrical signals and more particularly to a method and apparatus for converting minute direct current electrical signals into larger alternating current signals that can be more expediently and more accurately amplified and recorded or otherwise utilized and is a continuation-in-part of co-pending application Serial No. 353,647, filed May 7, 1953, for "Signal Convertor," now abandoned.

Almost all sensory elements of the type that produce electrical currents, for example, a strain gauge, or thermocouple, produce a minute direct electrical current indicative of the phenomenon under observation. It is then necessary to convert this electrical current into the mechanical movement of a meter hand that can be seen or the mechanical movement of the recording pen or the like that can be recorded, or the power to perform some control function. In many instances the direct electrical current generated by the sensory unit is of a very low order of magnitude. Thus, measured as voltage the sensory unit may not be able to generate more than a very few microvolts of direct current or, measured as current, it may not be able to generate more than a few microamperes. Obviously, such low voltages and low currents are incapable of operating the necessary indicating or recording or controlling equipment and therefore it is essential to amplify these signals to a very considerable extent before applying them to a meter or recorder or control mechanism.

Direct current amplifiers have been used for this purpose but have been found wanting. Their use results in drift, instability, and generally inaccurate results. The conversion of the direct current signals to alternating current and the subsequent amplification of these signals by alternating current amplifiers has also been attempted and has proved to be generally more satisfactory. A difficulty occurs, however, in converting the very minute direct current signals into alternating current signals, for while it is easy enough to convert direct current into alternating current it is also extremely easy to lose such minute currents as those with which we are here concerned in the process, and it is also very easy to introduce spurious currents in the process of conversion.

According to the present invention, it has been discovered that these very small direct current signals, from measuring instruments or other sources, may be used to effectively control a much greater alternating current so that in effect the direct current signals are simultaneously amplified and converted into alternating current signals of corresponding amplitude. Such signals can either be used directly for the intended purpose of indication, recording or control, or can be amplified and then used for any one of these purposes.

This conversion can be accomplished by applying a constant frequency, constant amplitude, alternating magnetic flux to a vibratable magnetic member, which is usually in the form of a vibratable magnetic strip anchored at one end and free at the other. The alternating magnetic field can be formed from a constant amplitude, constant frequency, alternating current applied to an electromagnet, or it can be formed by the mechanical rotation of a permanent magnet or the like. A magnetic pick-up device is then positioned near the vibratable member so that the vibration of this member will produce an alternating current voltage in the output of the device. The pick-up device should be so located with respect to the vibratable member as to be substantially shielded from the primary magnetic field which drives the member so that the output of the device is proportional to the amplitude of vibration of the vibratable member rather than to the magnetic field that drives the member.

Mounted on or attached to the vibratable member there is a non-magnetic but conductive member that vibrates with the vibratable member. The direct current signal from the measuring instrument or other source is converted into magnetic flux and applied perpendicular to the plane of vibration of the non-magnetic but conductive member, where it results in the formation of eddy currents by reason of the fact that the non-magnetic member is a conductor cutting lines of magnetic flux when vibrating. Since these eddy currents would not be formed if the non-magnetic member did not vibrate, the tendency of the member is to stop vibrating so as to reduce the eddy currents and this tendency becomes stronger as the flux resulting from the direct current signal is increased.

Consequently, the vibration of the vibratable member is dampened by the action of the direct current signals and this in turn reduces the amplitude of the output of the pick-up device. Thus the output of the pick-up device is controlled by the direct current signals and the effective result is the conversion of the direct current signals into corresponding but much larger alternating current signals.

Further details and advantages of this invention will be apparent from a consideration of the appended drawing and the following description of the device portrayed therein.

In the drawing:

A single figure is a diagrammatic illustration of a device constructed in accordance with the principles of this invention.

As illustrated, the device of this invention consists of a vibratable magnetic strip or reed 10 fixed rigidly to a base or other solid supporting member 11 at its bottom end and carrying non-magnetic but conductive damping element 12 at its upper end. The vibratable magnetic strip is caused to vibrate at a substantially constant frequency and amplitude by an alternating current of substantially constant frequency and amplitude applied through conductors 13 and 14 to an electromagnet 15 positioned adjacent one side of said vibratable strip. A magnetic pick-up 16 is positioned adjacent the other side of said vibratable strip. This pick-up device may be either an electromagnet or a permanent magnet surrounded by an output coil 24. As the vibrating member varies the reluctance of the air gap 25 an A.-C. voltage is developed across the output leads 17 and 18 for further use. Preferably the vibratable strip is of such dimensions as will permit it to act as an effective magnetic shield between the two coils. The output of the pick-up is then governed entirely by the amplitude and frequency of vibration of the vibratable magnetic strip 10.

A direct current signal that is, in effect, to be amplified and converted into an alternating current signal, enters the device through conductors 19 and 20 and is received by a coil 21 wound upon a magnetic core 22 which is provided with an air gap 23 which surrounds the non-magnetic damping member 12 mounted on the end of the vibratable magnetic strip 10. The core 22 is preferably of low reluctance material and the air gap is of sufficient dimensions so that the damping disc will not strike the core material when the magnetic strip is vibrating. The direct current magnetic flux across this air gap forms eddy currents in the non-magnetic but conductive damping element when the element is vibrating in a plane normal to the lines of flux and this controls the amplitude of vibration of the magnetic strip 10 thus controlling the output voltage of the pick-up 16.

It is desirable that the circuit of the pick-up 16 be of fairly high impedance in order that a current flow through the pick-up does not become so great as to materially affect the amplitude of vibration of the magnet strip 10.

Numerous modifications and changes in detail can be made in the above described device without departing from the spirit or scope of this invention, as will at once be apparent to those skilled in the art.

What is claimed is:

1. A method of converting small direct current signals into larger alternating current signals that comprises applying a constant frequency, constant amplitude alternating magnetic field to a vibratable magnetic member to cause it to vibrate at a substantially constant frequency and amplitude, positioning a pick-up device adjacent said vibrating member so that the vibrations thereof will induce an alternating current in said pick-up device, and varying the amplitude of the vibrations of the vibratable member by converting the direct-current signals into magnetic flux and applying that magnetic flux to a conductive, but non-magnetic member attached to said vibratable member, thereby to generate eddy currents in the non-magnetic member and dampen the vibrations of the vibratable member.

2. A device for converting small direct current signals into larger alternating current signals that comprises a vibratable magnetic member with a conductive but non-magnetic member attached thereto, means to apply a constant frequency, constant amplitude alternating magnetic field to said vibratable member to cause it to vibrate at a substantially constant frequency and amplitude, means to convert small direct current signals into magnetic flux and apply said magnetic flux to said conductive but non-magnetic member to generate eddy currents therein, and thus to dampen the vibrations of said vibratable member, and a pick-up device positioned adjacent to said vibrating member so that the vibrations thereof will induce an alternating current proportional to the amplitude thereof in said device.

3. A device as defined in claim 2 in which the vibratable magnetic member is in the form of a reed mounted at one end on a fixed support and carrying the conductive but non-magnetic member at the other end.

No references cited.